(12) United States Patent
Khaled et al.

(10) Patent No.: US 12,704,712 B2
(45) Date of Patent: Aug. 11, 2026

(54) PHOTONIC LOGIC GATES BASED ON S-MATRIX OPTIMIZATION

(71) Applicant: Milkshake Technology Inc., Menlo Park, CA (US)

(72) Inventors: Ahmed Khaled, Kingston (CA); Bhavin J. Shastri, Kingston (CA); Bicky A. Marquez, Kingston (CA); Orad Reshef, Ottawa (CA)

(73) Assignee: Milkshake Technology Inc., Menlo Park, CA (US)

( * ) Notice: Subject to any disclaimer, the term of this patent is extended or adjusted under 35 U.S.C. 154(b) by 695 days.

(21) Appl. No.: 18/204,220

(22) Filed: May 31, 2023

(65) Prior Publication Data

US 2024/0402485 A1 Dec. 5, 2024

(51) Int. Cl.
*G02B 27/00* (2006.01)

(52) U.S. Cl.
CPC ................................ *G02B 27/0012* (2013.01)

(58) Field of Classification Search
CPC .... G06F 16/24544; G06F 16/27; G06F 30/27; G06F 16/24537; G06F 16/24552; G02B 26/00; G02B 3/14; G02B 27/0012
USPC ................................................. 716/132–135
See application file for complete search history.

(56) References Cited

U.S. PATENT DOCUMENTS 7,671,687 B2 3/2010 LeChevalier
2002/0105690 A1 8/2002 Hattori et al.
2005/0129348 A1 6/2005 Iwasaki
2016/0373138 A1 12/2016 Li et al.
2019/0318234 A1 10/2019 Abel et al.
2020/0327269 A1* 10/2020 Pond .................. G06F 30/3308
2021/0398007 A1 12/2021 Thompson et al.
2022/0179159 A1* 6/2022 Wu ...................... G02B 6/4204
2023/0029063 A1* 1/2023 Pérez López .......... G06N 10/40
2024/0061282 A1 2/2024 Xu et al.

FOREIGN PATENT DOCUMENTS

WO WO 2022/262147 A1 12/2022

OTHER PUBLICATIONS

International Search Report and Written Opinion, Patent Cooperation Treaty Application No. PCT/CA2024/050284, mailing date May 27, 2024, 10 pages.
PCT International Search Report and Written Opinion, PCT Application No. PCT/US2024/022749, Jul. 17, 2024, 11 pages.

* cited by examiner

*Primary Examiner* — Binh C Tat
(74) *Attorney, Agent, or Firm* — Fenwick & West LLP

(57) ABSTRACT

Embodiments of the present disclosure are directed to an efficient design of a photonic circuit by an emulator circuit that optimizes coefficients of an S-matrix representation model of the photonic circuit. The emulator circuit comprises a first optimizer circuit, a comparator circuit, and a second optimizer circuit. The first optimizer circuit determines target coefficients of a target S-matrix representation model of the photonic circuit, based on photonic input signals and target photonic output signals of the target S-matrix representation model. The comparator circuit compares the target coefficients with device coefficients of an S-matrix representation model of the photonic circuit. The second optimizer circuit iteratively updates the device coefficients based on the comparison to determine final device coefficients. The photonic circuit is defined in accordance with the determined final device coefficients.

18 Claims, 7 Drawing Sheets

| Truth table | | |
|---|---|---|
| A | B | C |
| 0 | 0 | 0 |
| 0 | 1 | 1 |
| 1 | 0 | 1 |
| 1 | 1 | 0 |

| Truth table | | |
|---|---|---|
| A | B | C |
| 0 | 0 | 1 |
| 0 | 1 | 1 |
| 1 | 0 | 1 |
| 1 | 1 | 0 |

200

| Truth table | | |
|---|---|---|
| A | B | C |
| 0 | 0 | 0 |
| 0 | 1 | 1 |
| 1 | 0 | 1 |
| 1 | 1 | 0 |

A = 0, B = 0 → XOR → $C = O_1$ $FOM_1 = (0 - O_1)^2$

A = 0, B = 1 → XOR → $C = O_2$ $FOM_2 = (1 - O_2)^2$

A = 1, B = 0 → XOR → $C = O_3$ $FOM_3 = (1 - O_3)^2$

A = 1, B = 1 → XOR → $C = O_4$ $FOM_4 = (0 - O_4)^2$ $$FOM = FOM_1 + FOM_2 + FOM_3 + FOM_4$$

$$\begin{pmatrix} a^- \\ b^- \\ c^- \end{pmatrix} = \begin{pmatrix} S_{11} & S_{12} & S_{13} \\ S_{21} & S_{22} & S_{23} \\ S_{31} & S_{32} & S_{33} \end{pmatrix} \begin{pmatrix} a^+ \\ b^+ \\ c^+ \end{pmatrix}$$

405

$$\begin{pmatrix} a^- \\ b^- \\ c^- \end{pmatrix} = \begin{pmatrix} 0 & 0 & S_{13} \\ 0 & 0 & S_{23} \\ S_{13} & S_{23} & S_{33} \end{pmatrix} \begin{pmatrix} a^+ \\ b^+ \\ 0 \end{pmatrix}$$

Figure 5:
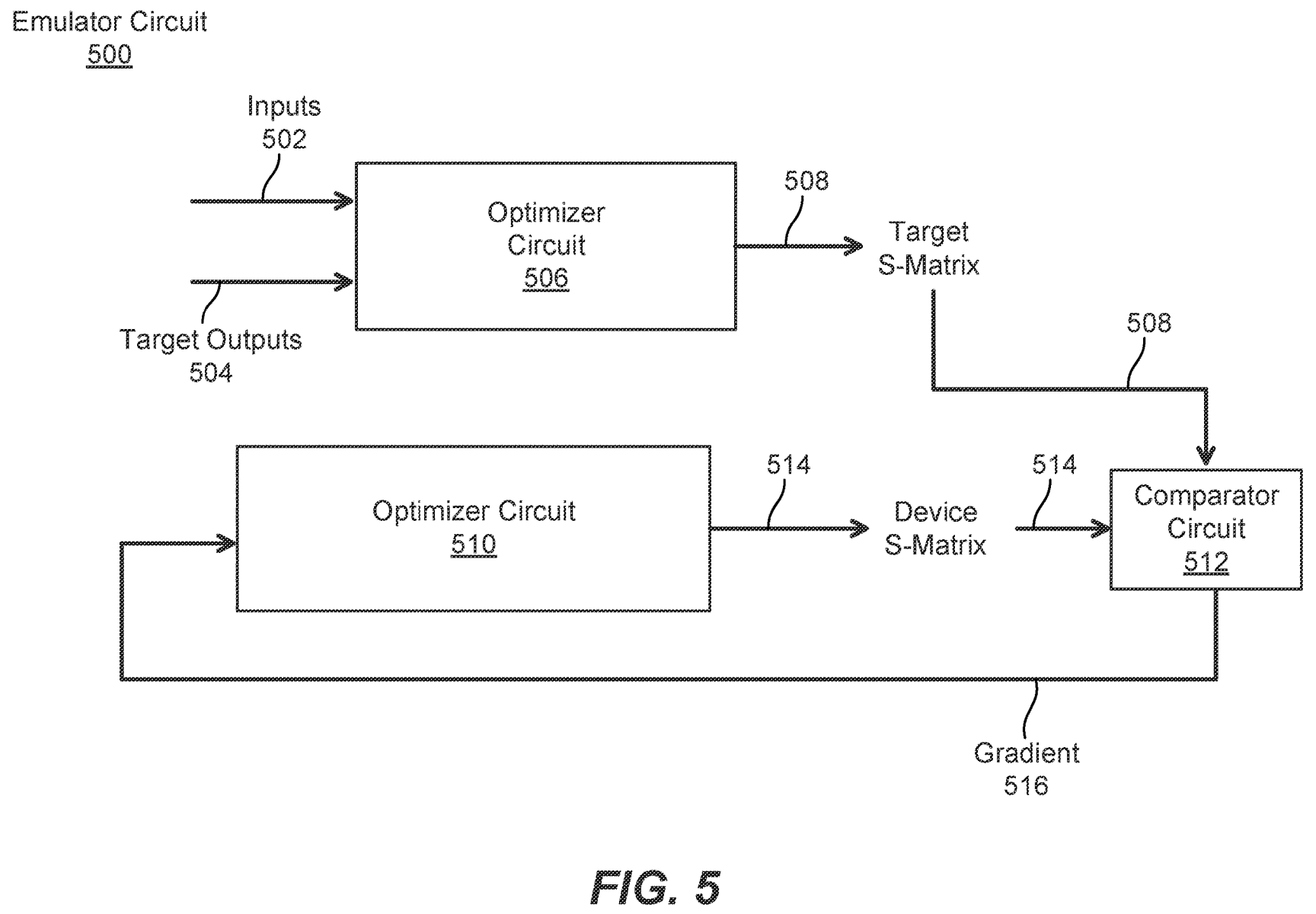

Emulator Circuit 500

Inputs 502

Target Outputs 504

Optimizer Circuit 506

508

Target S-Matrix

508

Comparator Circuit 512

Optimizer Circuit 510

514

Device S-Matrix

514

Gradient 516

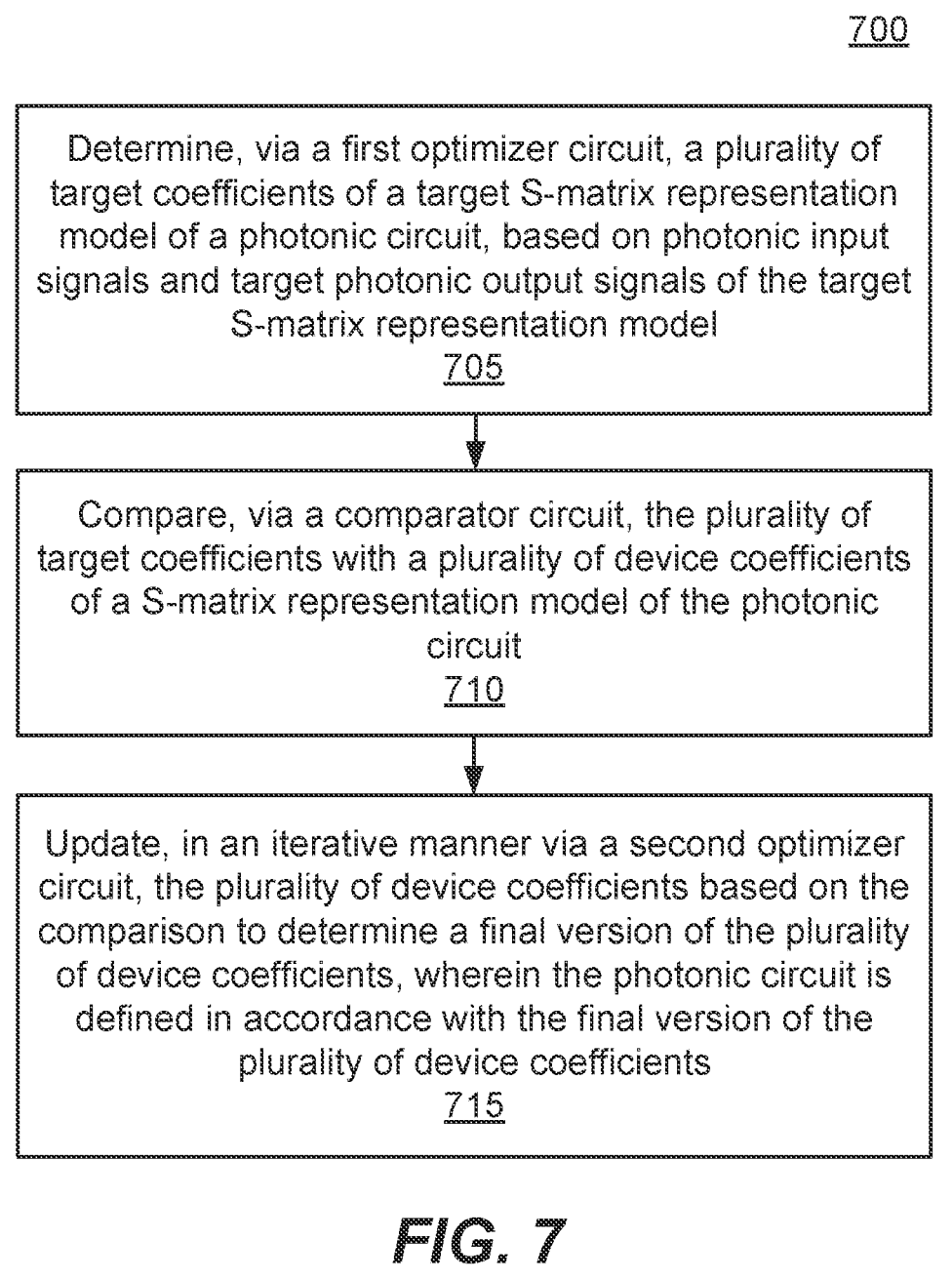

Determine, via a first optimizer circuit, a plurality of target coefficients of a target S-matrix representation model of a photonic circuit, based on photonic input signals and target photonic output signals of the target S-matrix representation model
705

Compare, via a comparator circuit, the plurality of target coefficients with a plurality of device coefficients of a S-matrix representation model of the photonic circuit
710

Update, in an iterative manner via a second optimizer circuit, the plurality of device coefficients based on the comparison to determine a final version of the plurality of device coefficients, wherein the photonic circuit is defined in accordance with the final version of the plurality of device coefficients
715

FIG. 7

PHOTONIC LOGIC GATES BASED ON S-MATRIX OPTIMIZATION

TECHNICAL FIELD

The present disclosure generally relates to a processor architecture and, more specifically, to S-matrix optimization of photonic logic gates.

BACKGROUND

Photonic hardware is favorable for applications requiring a high bandwidth, low latency, and low switching energy for signal processing and data communications. Recent innovations in silicon photonic fabrication have enabled the on-chip implementation of photonic circuits. This has opened a low-cost, high-precision, and scalable avenue for the development of photonic computing. Advances in photonic computing have demonstrated suitability for applications requiring high-bandwidth parallel processing offering higher speed and less energy consumption than equivalent networks implemented in digital electronics. However, an efficient design of photonic circuits remains a challenge.

SUMMARY

Embodiments of the present disclosure are directed to an efficient design of a photonic circuit by an emulator circuit that optimizes coefficients of an S-matrix representation model of the photonic circuit. The emulator circuit comprises a first optimizer circuit, a comparator circuit, and a second optimizer circuit. The first optimizer circuit is configured to determine a plurality of target coefficients of a target S-matrix representation model of a photonic circuit, based on photonic input signals and target photonic output signals of the target S-matrix representation model. The comparator circuit is configured to compare the plurality of target coefficients with a plurality of device coefficients of a S-matrix representation model of the photonic circuit. The second optimizer circuit is configured to iteratively update the plurality of device coefficients based on the comparison to determine a final version of the plurality of device coefficients. The photonic circuit is defined in accordance with the final version of the plurality of device coefficients.

Embodiments of the present disclosure are further directed to a non-transitory computer-readable storage medium comprising stored instructions that, when executed by at least one processor, cause the at least one processor to: determine a plurality of target coefficients of a target S-matrix representation model of a photonic circuit, based on photonic input signals and target photonic output signals of the target S-matrix representation model; compare the plurality of target coefficients with a plurality of device coefficients of a S-matrix representation model of the photonic circuit; and update in an iterative manner the plurality of device coefficients based on the comparison to determine a final version of the plurality of device coefficients, wherein the photonic circuit is defined in accordance with the final version of the plurality of device coefficients obtained by the emulator circuit.

Embodiments of the present disclosure are further directed to a method for efficient designing of a photonic circuit by optimizing coefficients of an S-matrix representation model of the photonic circuit. The method comprises: determining, via a first optimizer circuit, a plurality of target coefficients of a target S-matrix representation model of a photonic circuit, based on photonic input signals and target photonic output signals of the target S-matrix representation model; comparing, via a comparator circuit, the plurality of target coefficients with a plurality of device coefficients of a S-matrix representation model of the photonic circuit; and updating, in an iterative manner via a second optimizer circuit, the plurality of device coefficients based on the comparison to determine a final version of the plurality of device coefficients, wherein the photonic circuit is defined in accordance with the final version of the plurality of device coefficients.

BRIEF DESCRIPTION OF THE DRAWINGS

FIG. 2 illustrates an example calculation of a figure of merit (FOM) for inverse design for a two-bit input XOR photonic gate, in accordance with some embodiments.

FIG. 5 illustrates an example block diagram of an emulator circuit for optimizing device coefficients of an S-matrix representation model of a photonic circuit to match target coefficients, in accordance with some embodiments.

FIG. 7 is a flowchart illustrating an example method for optimizing device coefficients of an S-matrix representation model of a photonic circuit to match target coefficients, in accordance with some embodiments.

The figures depict embodiments of the present disclosure for purposes of illustration only. One skilled in the art will readily recognize from the following description that alternative embodiments of the structures and methods illustrated herein can be employed without departing from the principles or benefits touted by the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that can be employed without departing from the principles of what is claimed.

Reference will now be made in detail to several embodiments, examples of which are illustrated in the accompanying figures. It is noted that wherever practicable similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Embodiments of the present disclosure are directed to circuits and methods for efficient design of photonic gates. The design of photonic gates presented herein is based on optimizing coefficients of an S-matrix representation model of a corresponding photonic gate. Coefficients of a target S-matrix representation model of the photonic gate may be first determined, based on photonic input signals and target photonic output signals of the target S-matrix representation model. The coefficients of the target S-matrix representation model may be compared with device coefficients of an S-matrix representation model of the photonic gate. The device coefficients may be iteratively updated based on the comparison to determine final device coefficients of the S-matrix representation model of the photonic gate. The photonic gate may be defined in accordance with the final device coefficients.

The present disclosure describes methods and circuits for efficient designing of photonic logic gates. A photonic logic gate can be efficiently designed to have any number of input ports ($N_{IN}$) and any number of output ports ($N_{OUT}$), while satisfying a corresponding truth table that defines relationships between photonic input signals and photonic output signals of the photonic logic gate.

Figure 1A:
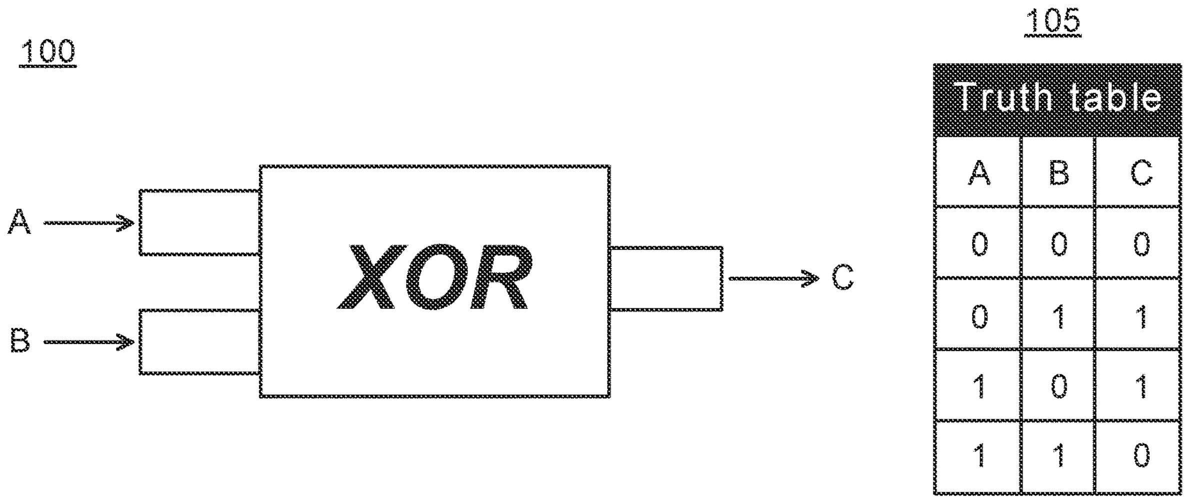
FIG. 1A illustrates an example two-bit input XOR photonic gate with a input XOR photonic gate with a corresponding truth table, in accordance with some embodiments.

FIG. 1A illustrates an example two-bit input XOR photonic gate 100 with a corresponding truth table 105, in accordance with some embodiments. The XOR photonic gate 100 may be a linear photonic gate or non-linear photonic gate that receives a pair of photonic input signals A and B, and generates a corresponding photonic output signal C in accordance with the truth table 105. Thus, for the XOR photonic gate 100, the number of input ports, $N_{IN}$, is two, and the number of output ports, $N_{OUT}$, is one. The photonic input signals A, B may be light signals of corresponding input amplitudes (that correspond to logical "1" or logical "0"), corresponding input phases and/or corresponding input modes (i.e., input light spatial distribution and/or input wavelengths) injected into a set of photonic input ports of the XOR photonic gate 100. The set of photonic input ports may represent, e.g., a set of waveguides, a set of waveguide polarizations, a set of waveguide modes, a set of light wavelengths, etc. The photonic output signal C may be a light signal of a corresponding output amplitude (which corresponds to logical "1" or logical "0"), corresponding output phase and/or corresponding output mode (i.e., output light spatial distribution and/or output wavelength) detected at a photonic output port of the XOR photonic gate 100. The photonic output port may represent, e.g., a waveguide, a waveguide polarization, a waveguide mode, a light wavelength, a signal radiated by the XOR photonic gate 100, etc. The methods and circuits presented herein (e.g., as shown in relation to FIGS. 5-7) may be applied for an efficient design of the XOR photonic gate 100.

Figure 1B:
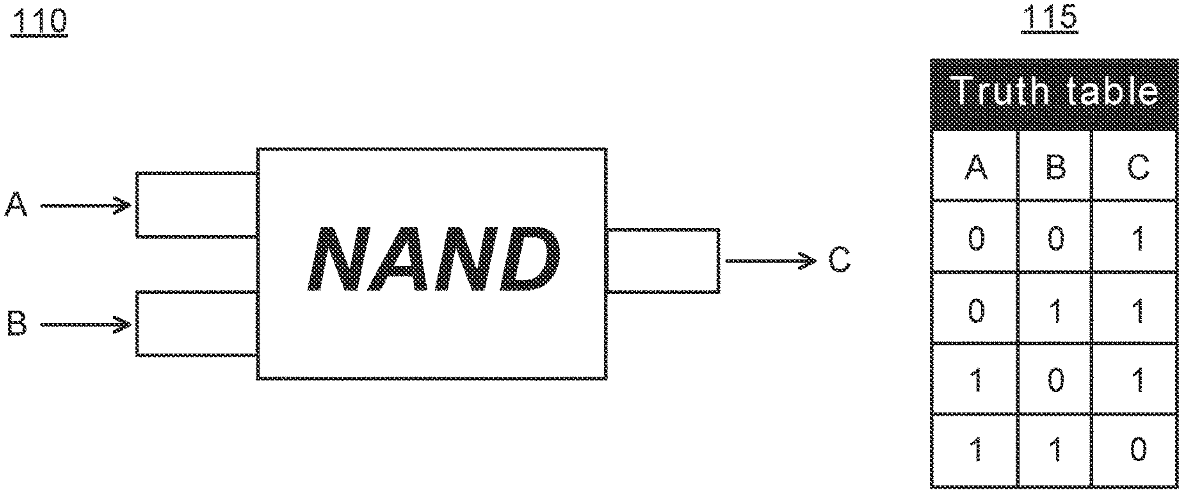
FIG. 1B illustrates an example two-bit input NAND photonic gate with a corresponding truth table, in accordance with some embodiments.

FIG. 1B illustrates an example two-bit input NAND photonic gate 110 with a corresponding truth table 115, in accordance with some embodiments. The NAND photonic gate 110 may be a linear photonic gate or non-linear photonic gate that receives a pair of photonic input signals A and B, and generates a corresponding photonic output signal C in accordance with the truth table 115. Thus, for NAND photonic gate 110, the number of input ports, $N_{IN}$, is two, and the number of output ports, $N_{OUT}$, is one. The photonic input signals A, B may be light signals of corresponding input amplitudes (that correspond to logical "1" or logical "0"), corresponding input phases and/or corresponding input modes (i.e., input light spatial distribution and/or input wavelengths) injected into a set of photonic input ports of the NAND photonic gate 110. The set of photonic input ports may represent, e.g., a set of waveguides, a set of waveguide polarizations, a set of waveguide modes, a set of light wavelengths, etc. The photonic output signal C may be a light signal of a corresponding output amplitude (which corresponds to logical "1" or logical "0"), corresponding output phase and/or corresponding output mode (i.e., output light spatial distribution and/or output wavelength) detected at a photonic output port of the NAND photonic gate 110. The photonic output port may represent, e.g., a waveguide, a waveguide polarization, a waveguide mode, a light wavelength, a signal radiated by the NAND photonic gate 110, etc. The methods and circuits presented herein (e.g., as shown in relation to FIGS. 5-7) may be applied for an efficient design of the NAND photonic gate 110.

It should be understood that although FIGS. 1A-1B illustrate two-bit XOR and NAND photonic gates, the methods and circuits presented herein are general enough to be applied to various N-bit photonic gates (e.g., XOR, NAND, NOT, full adder, half adder, majority gate, choice gate, etc.), where $N \geq 1$. In one or more embodiments, one input signal in a set of input signals of an N-bit photonic gate can be a constant light signal of a predetermined amplitude. This particular photonic input signal that is always "turned on" can be referred to as a "bias signal". The bias signal can provide for improved performance for some of the N-bit photonic gates (e.g., NOT gate).

FIG. 2 illustrates an example calculation 200 of a figure of merit (FOM) for inverse design for a two-bit input XOR photonic gate, in accordance with example embodiments. In the examples, a two-bit input XOR photonic gate can be inverse designed using a finite-difference time-domain (FDTD) engine, i.e., the two-bit input XOR photonic gate can be optimized for a minimum FOM using inverse design in FDTD.

A photonic gate with $N_{IN}$ inputs may be inverse designed using FDTD simulations for all $2\hat{}N_{IN}$ input states of a corresponding truth table and collect corresponding $2\hat{}N_{IN}$ outputs. The collected outputs may be compared to the target truth table outputs by using an FOM function, and a gradient value may be determined based on the comparison. The determined gradient value may be then used to update design of the photonic gate.

However, the inverse design using FDTD simulations has certain limitations. First, it is not known what the limiting (ideal or preferred) FOM is. Thus, the design tradeoffs cannot be known. Exploring the limits and/or possible designs using FDTD simulations can be very time costly. Each iteration step in the FDTD-based optimization process can take anywhere from, e.g., minutes to hours, depending on the size of the photonic gates and the simulation accuracy. Second, the number of FDTD simulations needed per optimization iteration may scale exponentially with the number of photonic gate inputs. For example, for 2-bit input photonic gates, eight FDTD simulations (or four "pairs" of FDTD simulations) per optimization iteration are needed (i.e., for each state, two FDTD simulations per optimization iteration are required); for 4-bit input photonic gates, 32 FDTD simulations per optimization iteration are needed. This is a problem because each FDTD simulation can be time costly.

S-Matrix Representation of Photonic Logic Gates

Figure 3:
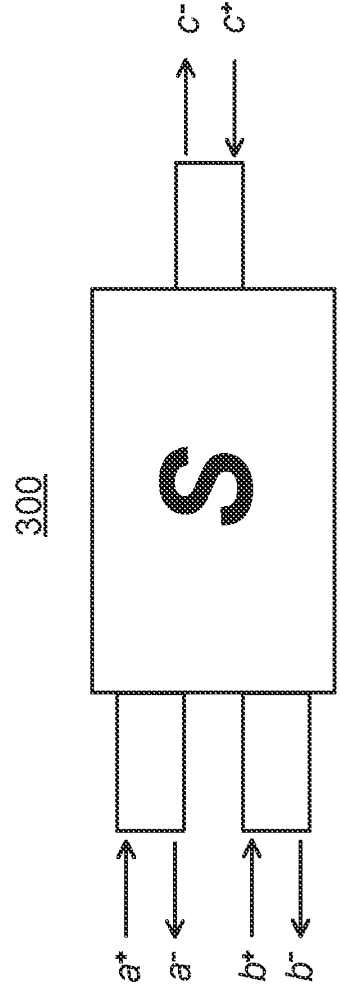
FIG. 3 illustrates an example photonic circuit with an S-matrix representation model, in accordance with some embodiments.

FIG. 3 illustrates an example photonic circuit 300 with an S-matrix representation model 305, in accordance with some embodiments. The photonic circuit 300 (e.g., a photonic logic gate) can be formulated as an S-matrix with coefficients that define relation between corresponding photonic inputs (e.g., input light waves $a^+$, $b^+$, and $c^+$) and corresponding photonic outputs (e.g., output light waves $a^-$, $b^-$, and $c^-$). The photonic circuit 300 may include a pair of photonic input ports and a photonic output port. Although FIG. 3 illustrates the photonic circuit 300 with two photonic input ports and a single photonic output port, it should be understood that the photonic circuit 300 can include any number of photonic input ports and photonic output ports. Each of the photonic input ports and the photonic output port may feature complex incident light waves (e.g., incident light waves $a^+$, $b^+$, and $c^+$) and complex reflected light waves (e.g., reflected light waves $a^-$, $b^-$, and $c^-$). The photonic input ports and the photonic output port of the photonic circuit 300 may be at least one of: a set of waveguides, a set of waveguide polarizations, a set of waveguide modes, a set of light wavelengths, and one or more signals radiated by the photonic circuit 300.

The S-matrix that defines operation of the photonic circuit 300 may have several features. If the photonic circuit 300 is a matched device, then $S_{ii}=0$, where i=1, 2, . . . , M (e.g., M=3). If the photonic circuit 300 is a lossless device, then $\Sigma_i|S_{ij}|^2=1$, $\forall j$, where i=1, 2, . . . , M (e.g., M=3). If the photonic circuit 300 is a reciprocal device, then $S_{ij}=S_{ji}$, where i=1, 2, M and j=1, 2, . . . , N (e.g., M=N=3). If the photonic circuit 300 is a passive linear gate, then the photonic circuit 300 is also a reciprocal device. As a passive linear gate, the photonic circuit 300 does not have a gain, i.e., $\Sigma_i|S_{ij}|^2\leq 1$, $\forall j$, where i=1, 2, . . . , M (e.g., M=3).

An output equation of the photonic circuit 300 that describes the performance of the photonic circuit 300 can be written as, e.g., $c^-=S_{31}a^++S_{32}b^+$. Note that the light wave $c^+$ incident to the photonic output port of the photonic circuit 300 can be considered to be zero for practical purposes (i.e., there is no photonic input signal from the photonic output port). For the photonic circuit 300 that represents an n-bit photonic gate (e.g., n=2) having a corresponding truth table with $2^n$ entries, $2^n$ different output equations can be obtained. The system of $2^n$ output equations can be solved for the S-parameters (e.g., $S_{31}$ and $S_{32}$ parameters), e.g., by employing a numerical optimizer solution. Note that this may not be an FDTD solution, and the S-parameters may be optimized very fast (e.g., in matter of seconds). The numerical optimizer solution for the system of $2^n$ output equations allows fast exploration of many possible solutions for the S-parameters.

Note that in the general case of the photonic circuit 300 being an n-bit input and m-bit output photonic gate, the photonic circuit 300 can be represented with only n·m relevant parameters of an S-matrix, i.e., only those parameters of the S-matrix that relate each photonic output and all photonic inputs. For example, when the photonic circuit 300 is a two-bit input and one-bit output photonic gate (e.g., as shown in FIG. 3), the photonic circuit 300 can be effectively represented with two relevant S-parameters (e.g., $S_{31}$ and $S_{32}$ parameters). To evaluate the relevant S-parameters (i.e., the S-parameters that relate input photonic signals to output photonic signal(s)) in a numerical simulation, either a light wave can be injected at each photonic input port, or a light wave can be injected at each photonic output port. Thus, there are minimum (n, $N_{OUT}$) pairs of simulations per optimization iteration, instead of $2^n$ pairs of simulations per optimization iteration, where $N_{OUT}$ is a number of photonic output ports of the n-bit photonic gate (e.g., $n\geq N_{OUT}$). Hence, in the worst case, the number of numerical simulations per optimization iteration may be reduced from $2^n$ to n, i.e., the exponential complexity of numerical simulations may be reduced to linear complexity.

Figure 4:
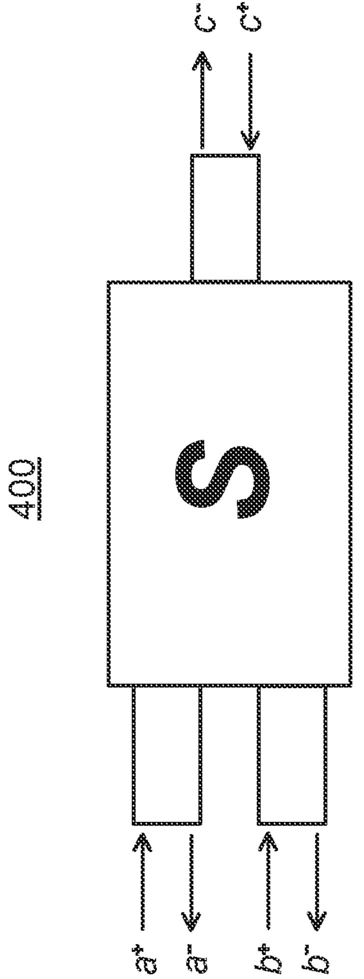
FIG. 4 illustrates an example photonic circuit and an S-matrix representation model for the photonic circuit, in accordance with some embodiments.

FIG. 4 illustrates an example photonic circuit 400 and an S-matrix representation model 405 for the photonic circuit 400, in accordance with some embodiments. The S-matrix representation model 405 may correspond to operations and performance of the photonic circuit 400 that operates as, e.g., a two-bit input XOR photonic gate that is both passive and linear. Hence, the photonic circuit 400 is a reciprocal device, and $S_{ij}=S_{ji}$. Since it is desired to feature matching in both photonic input ports, then $S_{11}=S_{22}=0$. Also, it is desired to feature isolations (i.e., non-interference) of photonic input ports, then $S_{12}=S_{21}=0$. As no power (e.g., no light wave signal) is input into a photonic output port, then the output light wave $c^+$ is non-existent, i.e., $c^+=0$.

After enforcing a truth table for the two-bit input XOR photonic gate while considering an arbitrary phase $\varphi$ of photonic input and output signals, the following holds:

$$a^+=\exp(j\varphi_a),\ b^+=0,\ \text{then}\ c^-=\exp(j\varphi_{ca})=S_{13}\exp(j\varphi_a), \quad (1)$$

$$a^+=0,\ b^+=\exp(j\varphi_b),\ \text{then}\ c^-=\exp(j\varphi_{cb})=S_{23}\exp(j\varphi_b), \quad (2)$$

$$a^+=\exp(j\varphi_a),\ b^+=\exp(j\varphi_a),\ \text{then}\ c^-=0=S_{13}\exp(j\varphi_a)+S_{23}\exp(j\varphi_b), \quad (3)$$

where a, b and c are magnitudes of light waves $a^+$, $b^+$, and $c^-$ respectively. After including Eq. (1) and Eq. (2) into Eq. (3), it is obtained that $0=\exp(j\varphi_{ca})+\exp(j\varphi_{cb})$. Note that either $S_{13}=S_{23}\rightarrow 1/\sqrt{2}$ and $\varphi_{ca}$ and $\varphi_{cb}$ are 180° apart, or $|S_{13}|=|S_{23}|\rightarrow 1/\sqrt{2}$, where the phases of $S_{13}$ and $S_{23}$ are 180° apart but $\varphi_{ca}$ and $\varphi_{cb}$ are in phase. The approach described in Eqs. (1)-(3) is provided herein for an example two-bit XOR photonic gate but can be generalized for any photonic gate of any size.

Certain limitations can be established in relation to the S-matrix representation model 405. First, from Eq. (1) it may hold that $|S_{13}|=1$, and from Eq. (2), it may hold that $|S_{23}|=1$. However, it is not possible that both $|S_{13}|=1$ and $|S_{23}|=1$ as the power conservation would be violated. The power conservation can be defined as $\Sigma i|S_{ij}|^2\leq 1\ \forall j$, e.g., $|S_{13}|^2+|S_{23}|^2+|S_{33}|^2\leq 1$ for the photonic circuit 400. A preferred power transfer from both photonic input ports to the photonic output port of the photonic circuit 400 may be given as $|S_{13}|^2+|S_{23}|^2\rightarrow 1$. A preferred insertion loss may be at least 50% at $S_{13}=S_{23}$, thus $S_{13}=S_{23}\rightarrow 1/\sqrt{2}$. Second, from Eq. (3), in order to obtain the preferred insertion loss, either $S_{13}=S_{23}\rightarrow 1/\sqrt{2}$ and $\varphi_{ca}$ and $\varphi_{cb}$ are 180° apart or $|S_{13}|=|S_{23}|\rightarrow 1/\sqrt{2}$, where the phases of $S_{13}$ and $S_{23}$ are 180° apart but $\varphi_{ca}$ and $\varphi_{cb}$ are in phase. Note that even if the insertion loss is sacrificed and $\varphi_{ca}$, $\varphi_{cb}$ are in phase, the logical '11' state of the photonic circuit 400 may be corrupted, i.e., a non-zero output power can be obtained instead of obtaining the zero power output in the input case of '11'.

It can be concluded that the photonic circuit 400 operating as a two-bit XOR photonic gate has a preferred design specification when the insertion loss is 3 dB, and photonic outputs are out of phase to obtain the preferred insertion loss. If in-phase outputs are designed for the photonic circuit 400 operating as the two-bit XOR photonic gate, that two-bit XOR photonic gate can never work. The preferred design solution for the photonic circuit 400 operating as the two-bit XOR photonic gate is given by $S_{13}=S_{23}=1/\sqrt{2}$, in order to obtain the aforementioned preferred design specification. For the two-bit XOR photonic gate, parameters $S_{13}$ and $S_{23}$ may be extracted in simulations using only one FDTD simulation because minimum (n, $N_{OUT}$)=1. Each numerical iteration requires one pair of FDTD simulations instead of four pairs of simulations in the case of inverse FDTD design, resulting in $2^n$ to 1 savings in the number of numerical simulations per optimization iterations. For more complex photonic gates, the preferred design solution can be obtained by utilizing one or more numerical optimizer circuits (e.g., as described in relation to FIGS. 5-6).

Design of Photonic Logic Gates Based on S-Matrix Optimization

FIG. 5 illustrates an example block diagram of an emulator circuit 500 for optimizing device coefficients of an S-matrix representation model of a photonic circuit (e.g., photonic gate) to match target coefficients, in accordance with example embodiments. The emulator circuit 500 may include an optimizer circuit 506, an optimizer circuit 510, and a comparator circuit 512. The emulator circuit 500 may include one or more additional components not shown in FIG. 5.

The optimizer circuit 506 may determine target coefficients 508 of a target S-matrix representation model of the photonic circuit, based on photonic input signals 502 and target photonic output signals 504 of the target S-matrix representation model. The photonic input signals 502 and the target photonic output signals 504 may comprise a plurality of light signals injected in at least one of a set of photonic input ports of the photonic circuit and a set of photonic output ports of the photonic circuit. The optimizer circuit 506 may be configured to numerically optimize relevant parameters of an S-matrix that represents the photonic circuit (e.g., photonic gate) so that the S-matrix satisfies a corresponding truth table of the photonic circuit. This S-matrix represents the target S-matrix representation model of the photonic circuit. The optimizer circuit 506 may provide the determined target coefficients 508 to the comparator circuit 512.

The optimizer circuit 510 may iteratively update device coefficients 514 of a device S-matrix representation model of the photonic circuit based a comparison between the device coefficients 514 and the target coefficients 508 to determine a final version of the device coefficients 514. The photonic circuit (e.g., photonic gate) can be then defined in accordance with the final version of the device coefficients 514. At first, the optimizer circuit 510 may be utilized to define an initial random photonic circuit (e.g., initial photonic gate). After that, the optimizer circuit 510 may extract relevant S-matrix parameters (i.e., an initial version of the device coefficients 514) using minimum ($N_{IN}$, $N_{OUT}$) numerical simulations (e.g., FDTD simulations). The device coefficients 514 may emulate relations between a set of photonic input signals and a set of photonic output signals for the photonic circuit being designed. The optimizer circuit 510 may provide the device coefficients 514 to the comparator circuit 512.

The comparator circuit 512 may compare the target coefficients 508 (e.g., the target S-matrix) with the device coefficients 514 (e.g., the extracted device S-matrix). Then, the comparator circuit 512 may update a gradient value 516 based on the comparison. The comparator circuit 512 may compare the target coefficients 508 with the device coefficients 514 using, e.g., an FOM function. To update the gradient value 516, another minimum ($N_{IN}$, $N_{OUT}$) numerical simulations (i.e., "adjoint simulations") may be performed at the comparator circuit 512. In particular, based on the comparison, the comparator circuit 512 may perform minimum ($N_{IN}$, $N_{OUT}$) numerical simulations to update the gradient value 516, which concludes one optimization iteration. Note that, to extract the relevant S-matrix parameters (i.e., the device coefficients 514), minimum ($N_{IN}$, $N_{OUT}$) numerical simulations at the optimizer circuit 510 is required. Additionally, the comparator circuit 512 compares the extracted S-matrix parameters (i.e., the device coefficients 514) to the target coefficients 508, and performs another minimum ($N_{IN}$, $N_{OUT}$) numerical simulations to update the gradient value 516. Therefore, the entire optimization takes a pair of minimum ($N_{IN}$, $N_{OUT}$) numerical simulations per optimization iteration to update the gradient value 516. The comparator circuit 512 may pass the updated gradient value 516 onto the optimizer circuit 510.

The optimizer circuit 510 may determine an updated version of the device coefficients 514, based on the gradient value 516. The optimizer circuit 510 may pass the updated version of the device coefficients 514 to the comparator circuit 512. The comparator circuit 512 may compare the target coefficients 508 with the updated version of the device coefficients 514 and update the gradient value 516 based on the comparison. The aforementioned operations of the optimizer circuit 510 and the comparator circuit 512 may be repeated until the gradient value 516 determined by the comparator circuit 512 becomes less than or equal to a threshold value (e.g., zero, or non-zero value). A last version of updated device coefficients 514 determined by the optimizer circuit 510 determined based on the last updated gradient value 516 may represent the final version of the device coefficients 514. The final version of the device coefficients 514 may differ from the target coefficients 508 by one or more predetermined threshold amounts. In one or more embodiments, the final version of the device coefficients 514 may be equal to the target coefficients 508, and the gradient value 516 may be equal to zero. The final version of the device coefficients 514 may emulate operations of the designed photonic circuit.

It should be noted that the emulator circuit 500 may first perform an optimization of an S-matrix to obtain a target S-matrix (e.g., performed by the optimizer circuit 506), which may be then followed by an optimization of a photonic circuit using numerical simulations (e.g., FDTD simulations) to match the target S-matrix (e.g., performed by the optimizer circuit 510 and the comparator circuit 512) and determine the device coefficients 514 of the photonic circuit. In some embodiments, the emulator circuit 500 may be configured to perform a modified version of the aforementioned approach that can be referred to as "S-matrix-FDTD co-optimization" to determine the device coefficients 514 for emulating operations of the photonic circuit.

For the S-matrix-FDTD co-optimization, the optimizer circuit 510 may be first utilized to define an initial random photonic circuit (e.g., initial photonic gate). After that, the optimizer circuit 510 may extract relevant S-matrix parameters (i.e., an initial version of the device coefficients 514) using minimum ($N_{IN}$, $N_{OUT}$) numerical simulations (e.g., FDTD simulations). As the optimizer circuit 510 generates an S-matrix model of the photonic circuit, all $2^\wedge N_{IN}$ input states of a truth table of the photonic circuit may be input and corresponding $2^\wedge N_{OUT}$ outputs may be collected. This may be performed by, e.g., the optimizer circuit 510 or some other component of the emulator circuit 500 as a fast matrix-vector multiplication (e.g., performed without any extra simulations as the matrix-vector multiplication uses the S-matrix model that is already extracted from the simulations). The comparator circuit 512 may then compare the collected outputs to the target truth table outputs (e.g., by using an FOM function) and calculate a gradient value 516 based on the comparison. The optimizer circuit 510 and comparator circuit 512 may then iteratively update the gradient value 516 and determine the final version of the device coefficients 514 that emulate operations of the designed photonic circuit.

There are some advantages of the aforementioned S-matrix-FDTD co-optimization method. First, a photonic circuit (e.g., photonic gate) may be optimized to respect an FOM that is directly derived from an output of the photonic circuit, which may be include, e.g., an output power, a contrast ratio between logic 0 and logic 1 powers, etc. This may provide improved final device coefficients 514, because matching an S-matrix of the photonic circuit to a specific and exact target S-matrix may be limiting. For example, there may exist multiple target S-matrices that satisfy a truth table of the photonic circuit, but these target S-matrices may differ only by a phase factor. Instead of being pre-set, the S-matrix-FDTD co-optimization method may allow selection of the phase factor that provides a preferred numerical simulation performance. This is equivalent to optimizing the S-matrix while optimizing the photonic circuit using numerical simulations (e.g., FDTD simulations). Second, the S-matrix-FDTD co-optimization method may allow the photonic circuit to have a different S-matrix for each light wavelength (e.g., wavelength-dependent S-matrix) as long as the photonic circuit outputs correct truth table outputs at each light wavelength. The S-matrix-FDTD co-optimization method is more flexible and allows for improved version of the device coefficients 514, because the S-matrix-FDTD co-optimization method is not trying to match a device S-matrix at all wavelengths to be the same as a predefined target S-matrix.

Note that the photonic circuit designed after multiple numerical iterations may be configured to operate as an N-bit photonic gate. The N-bit photonic gate may be, e.g., at least one of: one or more XOR photonic gates, one or more AND photonic gates, one or more NAND photonic gates, one or more half-adder photonic gates, one or more full adder photonic gates, one or more majority photonic gates, and one or more choice photonic gates.

Figure 6:
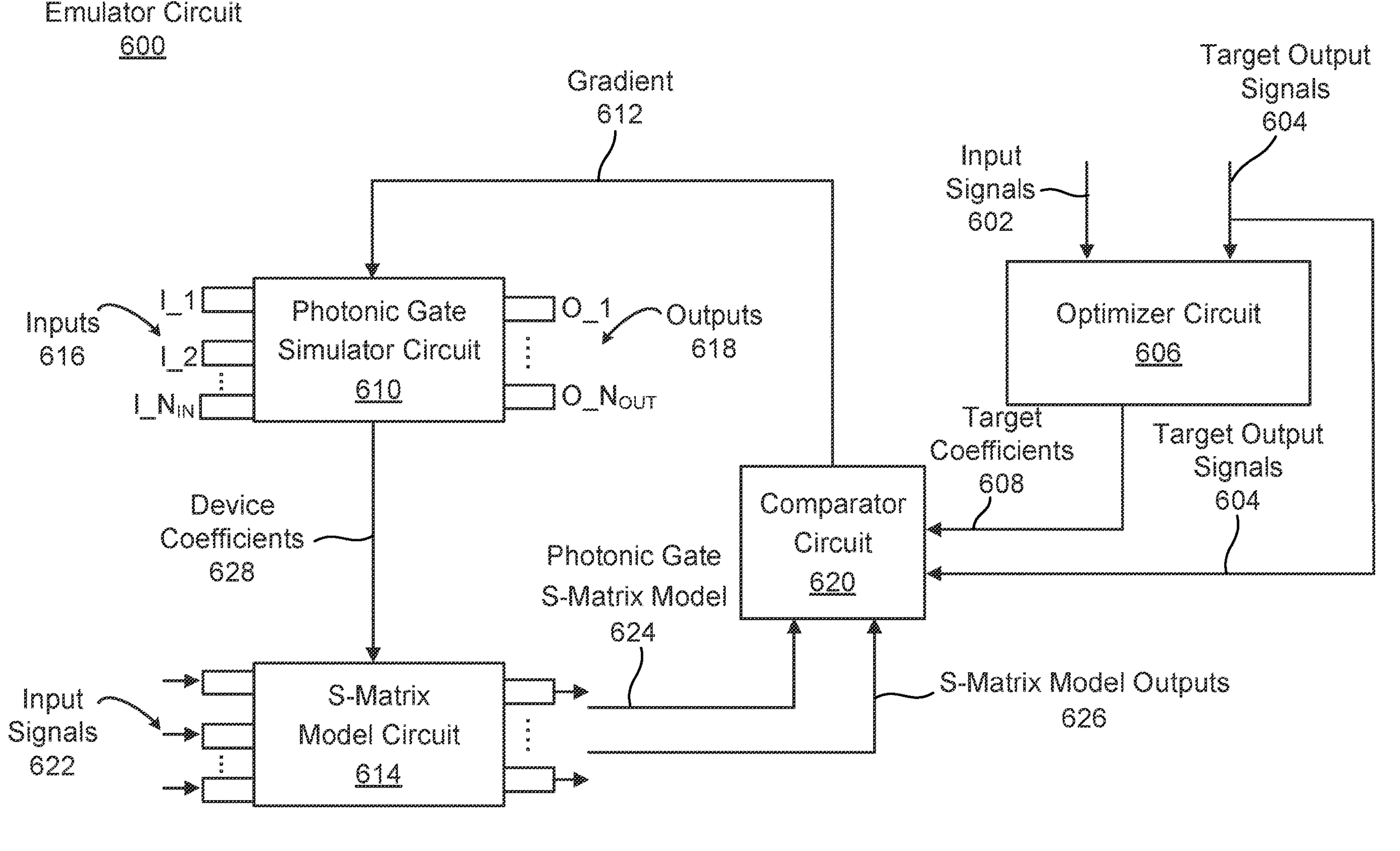
FIG. 6 illustrates another example block diagram of an emulator circuit for optimizing device coefficients of an S-matrix representation model of a photonic circuit to match target coefficients, in accordance with some embodiments.

FIG. 6 illustrates an example block diagram of an emulator circuit 600 for optimizing device coefficients of an S-matrix representation model of a photonic circuit to match target coefficients, in accordance with some embodiments. The emulator circuit 600 may include an optimizer circuit 606, a photonic gate simulator circuit 610, an S-matrix model circuit 614, and a comparator circuit 620. The emulator circuit 600 may include one or more additional components not shown in FIG. 6. The emulator circuit 600 may be configured to perform a combined optimization for designing the photonic circuit where simulated outputs are compared to both target coefficients of a target S-matrix representation model and target truth table outputs. The main difference of the emulator circuit 600 in comparison with the emulator circuit 500 is that device coefficients (e.g., device coefficients 628 in FIG. 6) of a device S-matrix representation model of a photonic circuit are not only compared to target coefficients (e.g., target coefficients 608) of a target S-matrix representation model of the photonic circuit, but output signals (e.g., S-matrix model outputs 626) from the device S-matrix representation model are also compared to target output signals (e.g., target output signals 604) of the photonic circuit.

The optimizer circuit 606 may determine the target coefficients 608 of the target S-matrix representation model of the photonic circuit, based on input signals 602 and the target output signals 604. The input signals 602 and the target output signals 604 may comprise a plurality of light signals injected in at least one of a set of photonic input ports of the photonic circuit and a set of photonic output ports of the photonic circuit. The optimizer circuit 606 may be configured to numerically optimize relevant parameters of an S-matrix that represents the photonic circuit (e.g., photonic gate) so that the S-matrix satisfies a corresponding truth table of the photonic circuit. This S-matrix represents the target S-matrix representation model of the photonic circuit. The optimizer circuit 606 may provide the target coefficients 608 to the comparator circuit 620.

The photonic gate simulator circuit 610 may simulate operations of the photonic circuit (e.g., n-bit photonic gate), and generate the device coefficients 628 of the device S-matrix representation model of the photonic circuit. The photonic circuit can be then defined in accordance with the device coefficients 628. The photonic circuit may be, e.g., an n-bit XOR photonic gate, n-bit AND photonic gate, n-bit NAND photonic gate, n-bit half-adder photonic gate, n-bit full adder photonic gate, n-bit majority photonic gate, n-bit choice photonic gate, some other photonic gate, or some combination thereof. The photonic gate simulator circuit 610 may receive a gradient value 612 from the comparator circuit 620. The photonic gate simulator circuit 610 may be configured as a numerical optimizer circuit that performs numerical simulations (e.g., FDTD simulations) on photonic inputs 616 (e.g., $N_{IN}$ photonic inputs I_1, . . . , I_$N_{IN}$) and photonic outputs 618 (e.g., Nour photonic inputs O_1, . . . , O_$N_{OUT}$) based on the gradient value 612. The number of numerical simulations performed by the photonic gate simulator circuit 610 may be equal to minimum ($N_{IN}$, $N_{OUT}$). The photonic gate simulator circuit 610 may extract the device coefficients 628 (i.e., S-parameters) of the device S-matrix representation model after the minimum ($N_{IN}$, $N_{OUT}$) numerical simulations. The photonic gate simulator circuit 610 may pass the extracted device coefficients 628 onto the S-matrix model circuit 614.

The S-matrix model circuit 614 may generate a photonic gate S-matrix model 624 and/or the S-matrix model outputs 626 by modeling the photonic circuit in accordance with the device coefficients 628 for each set of input signals 622 (e.g., as defined by the truth table). The S-matrix model circuit 614 may pass the photonic gate S-matrix model 624 and/or the S-matrix model outputs 626 to the comparator circuit 620 for comparison with the target coefficients 608 and/or the target output signals 604.

The comparator circuit 620 may compare the photonic gate S-matrix model 624 and/or the S-matrix model outputs 626 with the target coefficients 608 and/or the target output signals 604, and update the gradient value 612 based on the comparison. To update the gradient value 612 at the comparator circuit 620, another minimum ($N_{IN}$, $N_{OUT}$) numerical simulations (i.e., "adjoint simulations") may be performed at the comparator circuit 620. In particular, based on the comparison, the comparator circuit 620 may perform minimum ($N_{IN}$, $N_{OUT}$) numerical simulations to update the gradient value 612, which concludes one optimization iteration. Note that, to extract the relevant S-matrix parameters (i.e., the device coefficients 628), minimum ($N_{IN}$, $N_{OUT}$) numerical simulations at the photonic gate simulator circuit 610 may be required. Additionally, the comparator circuit 620 may compare the extracted S-matrix parameters (i.e., the photonic gate S-matrix model 624) to the target coefficients 608, compare the S-matrix model outputs 626 to the target output signals 604, and perform another minimum ($N_{IN}$, $N_{OUT}$) numerical simulations to update the gradient value 612. Therefore, the entire optimization may take a pair of minimum ($N_{IN}$, $N_{OUT}$) numerical simulations per optimization iteration to update the gradient value 612.

Note that an ideal FOM indicates that the photonic gate S-matrix model 624 equals the target coefficients 608, and/or the S-matrix model outputs 626 match the target outputs 604 defined for each set of input signals (e.g., as defined by the truth table). Thus, the gradient value 612 that is equal to zero indicates the ideal FOM for the device coefficients 628. The updated gradient value 612 determined by the comparator circuit 620 may be passed onto the photonic gate simulator circuit 610, and the photonic gate simulator circuit 610 may update the device coefficients 628 based on the updated gradient value 612. The aforementioned process may be repeated until the gradient value 612 becomes less than or equal to a defined threshold value (e.g., zero or non-zero value). The device coefficients 628 obtained for the last updated gradient value 612 may correspond to a final version of the device coefficients 628. The final version of the device coefficients 628 may emulate operations of the designed photonic circuit.

Example Process Flow

FIG. 7 is a flowchart illustrating an example method 700 for optimizing device coefficients of an S-matrix representation model of a photonic circuit to match target coefficients, in accordance with some embodiments. The operations of method 700 may be performed at an emulator circuit, e.g., the emulator circuit 500, or the emulator circuit 600. The emulator circuit may be deployed in a computing system that can further include a non-transitory computer-readable storage medium (e.g., optical, electrical, or electro-optical memory) for storing computer-executable instructions and data.

The emulator circuit determines 705 (e.g., via a first optimizer circuit), a plurality of target coefficients of a target S-matrix representation model of a photonic circuit, based on photonic input signals and target photonic output signals of the target S-matrix representation model. The photonic input signals and the target photonic output signals may comprise a plurality of light signals injected in at least one of a set of photonic input ports of the photonic circuit and a set of photonic output ports of the photonic circuit. The set of photonic input ports and the set of photonic output ports may represent at least one of: a set of waveguides, a set of waveguide polarizations, a set of waveguide modes, a set of light wavelengths, and one or more signals radiated by the photonic circuit.

The emulator circuit compares 710 (e.g., via a comparator circuit) the plurality of target coefficients with a plurality of device coefficients of an S-matrix representation model of the photonic circuit. The emulator circuit may compare (e.g., via the comparator circuit) a set of outputs of the S-matrix representation model with a set of the target photonic output signals for each set of the photonic input signals. The emulator circuit may determine (e.g., via the comparator circuit) a gradient value by comparing the plurality of target coefficients with the plurality of device coefficients. The emulator circuit may perform a set of numerical simulations (i.e., adjoint simulations) and a set of extraction simulations per iteration to determine the gradient value.

The emulator circuit updates 715 (e.g., via a second optimizer circuit), in an iterative manner, the plurality of device coefficients based on the comparison to determine a final version of the plurality of device coefficients, wherein the photonic circuit is defined in accordance with the final version of the plurality of device coefficients. The emulator circuit may determine (e.g., via the second optimizer circuit) the final version of the plurality of device coefficients that differ from the plurality of target coefficients by one or more predetermined threshold amounts. The emulator circuit may determine (e.g., via the second optimizer circuit) the final version of the plurality of device coefficients equal to the plurality of target coefficients. The emulator circuit may determine (e.g., via the second optimizer circuit) the final version of the plurality of device coefficients when the gradient value is less than a threshold value. The photonic circuit may be programmed (i.e., configured) to function within an integrated circuit in accordance with the final version of the plurality of device coefficients.

The emulator circuit may determine (e.g., via the second optimizer circuit) the final version of the plurality of device coefficients after a plurality of iterations when the photonic circuit is configured to operate as an N-bit photonic gate. The N-bit photonic gate may comprise at least one of: one or more XOR photonic gates, one or more AND photonic gates, one or more NAND photonic gates, one or more half-adder photonic gates, one or more full adder photonic gates, one or more majority photonic gates, and one or more choice photonic gates.

The plurality of device coefficients of the S-matrix representation model may define relations between the set of photonic input signals and the set of photonic output signals. The S-matrix representation model of the photonic circuit may be a reciprocal matrix of the plurality of device coefficients. A first subset of the plurality of device coefficients that represent matching in input ports of the photonic circuit may be set to zeroes. A second subset of the plurality of device coefficients that represent an isolation of input ports of the photonic circuit may be set to zeroes.

Embodiments of the present disclosure are directed to circuits and methods for efficient design of photonic gates using S-matrix based optimizations. With S-matrix based optimization methods presented herein, the design tradeoffs for a specific photonic gate are known, including the theoretical limitations on its performance and design performance. The number of numerical simulations required for designing a desired photonic gate is greatly reduced, i.e., from exponential complexity per optimization iteration to linear complexity, which provides huge savings on simulation resource complexity.

ADDITIONAL CONSIDERATIONS

The disclosed configurations beneficially provide for efficient design of photonic logic gates while greatly reducing a number of required numerical design simulations.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to effectively convey the substance of their work to others skilled in the art. While described functionally, computationally, or logically, these operations are understood to be implemented by computer programs or equivalent electrical circuits, microcode, or the like. Furthermore, at times, it has also proven convenient to refer to these arrangements of operations as modules without loss of generality. The described operations and associated modules can be embodied in software, firmware, hardware, or some combination thereof.

Any steps, operations, or processes described herein can be performed or implemented with one or more hardware or software modules, alone or in combination with other devices. In one embodiment, a software module is implemented with a computer program product comprising a computer-readable medium containing computer program code, which a computer processor can execute for performing any or all of the steps, operations, or processes described herein.

Embodiments of the disclosure can also relate to an apparatus for performing the operations herein. This apparatus can be specially constructed for the required purposes, and/or it can comprise a general-purpose computing device selectively activated or reconfigured by a computer program stored in the computer. Such a computer program can be stored in a non-transitory, tangible computer-readable storage medium or any media suitable for storing electrical instructions coupled to a computer system bus. Furthermore, any computing systems referred to in the specification can include a single processor or architectures employing multiple processor designs for increased computing capability.

Some embodiments of the present disclosure can further relate to a system comprising a processor, at least one computer processor, and a non-transitory computer-readable storage medium. The storage medium can store computer-executable instructions, which, when executed by the compiler operating on at least one computer processor, cause at least one computer processor to be operable for performing the operations and techniques described herein.

Finally, the language used in the specification has been principally selected for readability and instructional purposes, and it has not been selected to delineate or circumscribe the inventive subject matter. It is therefore intended that the scope of the disclosure be limited not by this detailed description but rather by any claims that issue on an application based hereon. Accordingly, the disclosure of the embodiments is intended to be illustrative, but not to limit the scope of the disclosure, which is set forth in the following claims.

What is claimed is:

1. An emulator circuit, comprising:

a first optimizer circuit configured to determine a plurality of target coefficients of a target S-matrix representation model of a photonic circuit, based on photonic input signals and target photonic output signals of the target S-matrix representation model;

a comparator circuit configured to compare the plurality of target coefficients with a plurality of device coefficients of a S-matrix representation model of the photonic circuit; and a second optimizer circuit configured to iteratively update the plurality of device coefficients based on the comparison to determine a final version of the plurality of device coefficients, wherein the photonic circuit is defined in accordance with the final version of the plurality of device coefficients, wherein the S-matrix representation model of the photonic circuit is a reciprocal matrix of the plurality of device coefficients, wherein a first subset of the plurality of device coefficients that represent matching in input ports of the photonic circuit are set to zeroes, and wherein a second subset of the plurality of device coefficients that represent an isolation of input ports of the photonic circuit are set to zeroes.

2. The emulator circuit of claim 1, wherein the comparator circuit is further configured to compare a set of outputs of the S-matrix representation model with a set of the target photonic output signals for each set of the photonic input signals.

3. The emulator circuit of claim 1, wherein the second optimizer circuit is further configured to determine the final version of the plurality of device coefficients that differ from the plurality of target coefficients by one or more predetermined threshold amounts.

4. The emulator circuit of claim 1, wherein the second optimizer circuit is further configured to determine the final version of the plurality of device coefficients equal to the plurality of target coefficients.

5. The emulator circuit of claim 1, wherein:

the comparator circuit is further configured to determine a gradient value by at least comparing the plurality of target coefficients with the plurality of device coefficients; and the second optimizer circuit is further configured to determine the final version of the plurality of device coefficients when the gradient value is less than a threshold value.

6. The emulator circuit of claim 1, wherein the photonic input signals and the target photonic output signals comprise a plurality of light signals injected in at least one of a set of photonic input ports of the photonic circuit and a set of photonic output ports of the photonic circuit.

7. The emulator circuit of claim 6, wherein the set of photonic input ports and the set of photonic output ports represent at least one of: a set of waveguides, a set of waveguide polarizations, a set of waveguide modes, a set of light wavelengths, and one or more signals radiated by the photonic circuit.

8. The emulator circuit of claim 1, wherein the plurality of device coefficients of the S-matrix representation model define relations between the set of photonic input signals of the photonic circuit and a set of photonic output signals of the photonic circuit.

9. The emulator circuit of claim 1, wherein the second optimizer circuit is further configured to determine the final version of the plurality of device coefficients after a plurality of iterations when the photonic circuit is configured to operate as an N-bit photonic gate.

10. The emulator circuit of claim 9, wherein the N-bit photonic gate comprises at least one of: one or more XOR photonic gates, one or more AND photonic gates, one or more NAND photonic gates, one or more half-adder photonic gates, one or more full adder photonic gates, one or more majority photonic gates, and one or more choice photonic gates.

11. A method, comprising:

determining, via a first optimizer circuit, a plurality of target coefficients of a target S-matrix representation model of a photonic circuit, based on photonic input signals and target photonic output signals of the target S-matrix representation model;

comparing, via a comparator circuit, the plurality of target coefficients with a plurality of device coefficients of a S-matrix representation model of the photonic circuit; and updating, in an iterative manner via a second optimizer circuit, the plurality of device coefficients based on the comparison to determine a final version of the plurality of device coefficients, wherein the photonic circuit is defined in accordance with the final version of the plurality of device coefficients, wherein the plurality of device coefficients of the S-matrix representation model define relations between a set of photonic input signals and a set of photonic output signals, wherein the set of photonic input signals and the set of photonic output signals comprise a plurality of light signals injected in at least one of a set of photonic input ports of the photonic circuit and a set of photonic output ports of the photonic circuit, and wherein the S-matrix representation model of the photonic circuit is a reciprocal matrix of the plurality of device coefficients.

12. The method of claim 11, further comprising:

comparing, via the comparator circuit, a set of outputs of the S-matrix representation model with a set of the target photonic output signals for each set of the photonic input signals.

13. The method of claim 11, further comprising:

determining, via the second optimizer circuit, the final version of the plurality of device coefficients equal to the plurality of target coefficients.

14. The method of claim 11, further comprising:

determining, via the comparator circuit, a gradient value by at least comparing the plurality of target coefficients with the plurality of device coefficients; and determining, via the second optimizer circuit, the final version of the plurality of device coefficients when the gradient value is less than a threshold value.

15. The method of claim 11, further comprising:

determining, via the second optimizer circuit, the final version of the plurality of device coefficients after a plurality of iterations when the photonic circuit is configured to operate as an N-bit photonic gate, and the N-bit photonic gate comprises at least one of: one or more XOR photonic gates, one or more AND photonic gates, one or more NAND photonic gates, one or more half-adder photonic gates, one or more full adder photonic gates, one or more majority photonic gates, and one or more choice photonic gates.

16. A non-transitory computer-readable storage medium comprising stored instructions that, when executed by at least one processor of an emulator circuit, cause the at least one processor to:

determine a plurality of target coefficients of a target S-matrix representation model of a photonic circuit, based on photonic input signals and target photonic output signals of the target S-matrix representation model;

compare the plurality of target coefficients with a plurality of device coefficients of a S-matrix representation model of the photonic circuit; and update in an iterative manner the plurality of device coefficients based on the comparison to determine a final version of the plurality of device coefficients, wherein the photonic circuit is defined in accordance with the final version of the plurality of device coefficients obtained by the emulator circuit, wherein the plurality of device coefficients of the S-matrix representation model define relations between a set of photonic input signals and a set of photonic output signals, wherein the set of photonic input signals and the set of photonic output signals comprise a plurality of light signals injected in at least one of a set of photonic input ports of the photonic circuit and a set of photonic output ports of the photonic circuit, and wherein the S-matrix representation model of the photonic circuit is a reciprocal matrix of the plurality of device coefficients.

17. The computer-readable storage medium of claim 16, wherein the stored instructions comprise further stored instructions that, when executed, cause the at least one processor to:

determine a gradient value by comparing the plurality of target coefficients with the plurality of device coefficients; and determine the final version of the plurality of device coefficients when the gradient value is less than a threshold value.

18. The computer-readable storage medium of claim 16, wherein the stored instructions comprise further stored instructions that, when executed, cause the at least one processor to:

program the photonic circuit to function within an integrated circuit in accordance with the final version of the plurality of device coefficients.

* * * * *